Oct. 25, 1966 D. H. ROGERS ETAL 3,281,708
BROADBAND AMPLIFIER
Filed June 6, 1962

INVENTORS.
Donald H. Rogers &
Merrill M. Godshall
BY
ATTORNEYS

United States Patent Office 3,281,708

Patented Oct. 25, 1966

3,281,708

BROADBAND AMPLIFIER

Donald H. Rogers, Ivyland, and Merrill M. Godshall, Warminster, Pa., assignors to Jerrold Electronics Corporation, Philadelphia, Pa., a corporation of Delaware Filed June 6, 1962, Ser. No. 200,469
4 Claims. (Cl. 330—154)

This invention relates to broadband amplifying systems and particularly to selective networks and amplifying systems for a plurality of separated radio frequency bands.

An application of the present invention is that of a preamplifier for television antenna signals which may be mounted on an antenna boom or at a convenient location in the path of the antenna transmission line. Thereby, maximum transfer of antenna energy is attained before down-lead losses in the transmission line occur to insure low noise reception. Among the desirable characteristics of such an amplifier is that it have long life and trouble-free performance, that it provide high gain for the low frequency and high frequency television bands, that it be compact and relatively inexpensive, that it have low power consumption and be conveniently powered by a remote power supply so that batteries are not required, and that it have high gain at all of the television channels.

It is an object of this invention to provide a new and improved amplifier for broadband amplification of separated frequency bands.

Another object is to provide a new and improved preamplifier for a television antenna that is effective for broadband amplification of the low frequency and high frequency television bands.

Another object is to provide a single electric circuit that presents a substantially uniform impedance response or resonance response to a plurality of separated radio frequency bands.

A feature of this invention is a quadrupole tuned circuit formed by two double-tuned networks each having series and shunt impedances and different bandpass characteristics. First terminal impedances of these networks are connected in series, and second terminal impedances are connected in parallel paths to a terminal. In one form of the invention the signal source is connected across the series terminal impedance of both networks, and the second terminal impedances are connected to an output terminal. In the other form, a load is connected across the series impedances, and the second terminal impedances are connected to an input terminal.

Another feature of this invention is that of a broadband amplifier using the aforementioned quadrupole circuit as an output circuit or as an input circuit.

Figure 1:
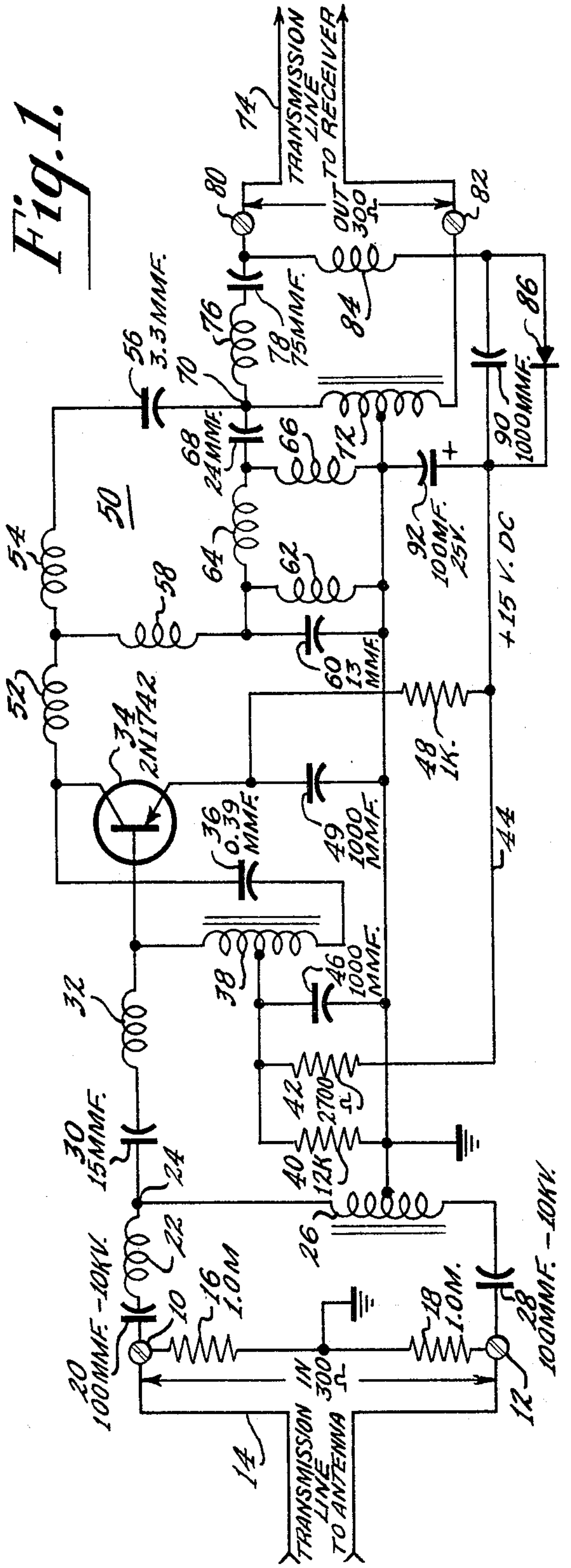
Figure 2:
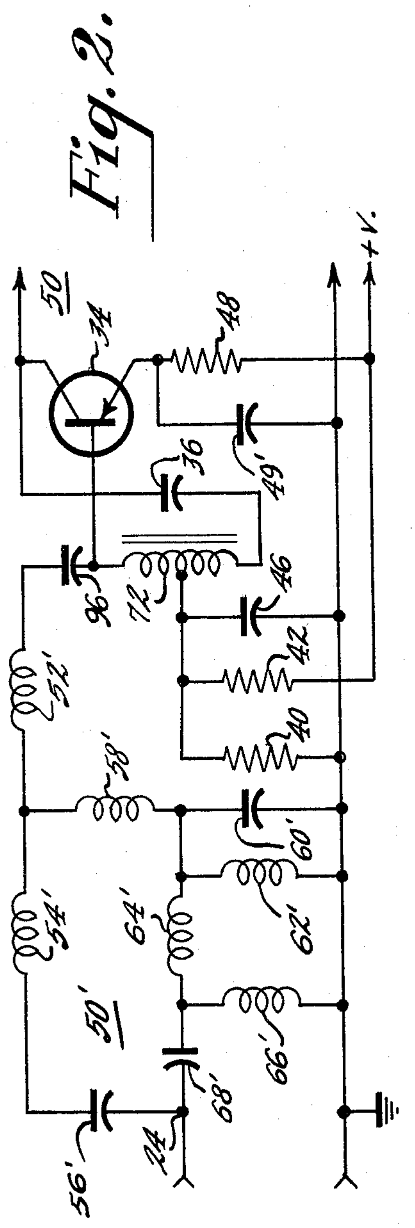

The foregoing and other objects of this invention, the features thereof, as well as the invention itself, may be more fully understood from the following description when read together with the accompanying drawing, in which:

FIG. 1 is a schematic circuit diagram of a broadband amplifier embodying this invention; and FIG. 2 is a schematic circuit diagram of a modification of the circuit of FIG. 1.

In the drawing, similar parts are referenced throughout by corresponding reference numerals.

In FIG. 1 a pair of input terminals 10, 12 are connected to the twin leads of a balanced transmission line 14 to receive signals from a television antenna. The transmission line 14 may be of the conventional type having a 300 ohm impedance. The input terminals 10 and 12 are respectively connected by resistors 16 and 18 to ground and function to provide a high resistance leakage path from the balanced input terminals for any electrical charge developed there. The input terminal 10 is connected by a capacitor 20 and an inductor 22 to a terminal 24 of a transformer 26, and input terminal 12 is connected by capacitor 28 to the other end of transformer 26. An intermediate tap of the transformer 26 is connected to ground. The network composed of the elements 20, 22, 26, and 28 functions to transform the 300 ohm balanced input impedance to an unbalanced input impedance at terminal 24 of approximately 75 ohms.

The terminal 24 is connected via series capacitor 30 and inductor 32 to the base of transistor 34. The collector of the transistor 34 is connected through a feedback capacitor 36 to one terminal of a neutralizing transformer 38, the other terminal of which is connected to the base of transistor 34. A tap on the transformer 38 is connected to the junction of two resistors 40 and 42, the other terminals of which are respectively connected to ground and to a line 44 carrying a positive direct biasing voltage. A shunt capacitor 46 is connected across the bias resistor 40. The resistors 40 and 42 are connected as a voltage divider to establish the base bias potential.

The capacitor 30, in addition to serving with the elements of the impedance transformation network 20, 22, 26, and 28, also functions with inductance 32 and the primary inductance of transformer 38 as well as the input capacitance of transistor 34 to form a broadband double-tuned circuit effective to pass a range of frequencies over both separated bands of television signals; that is, the frequency band from 54 to 216 megacycles. The neutralizing transformer 38 together with the feedback capacitor 36 insures a feedback signal of the proper phase and magnitude to cancel out the internal feedback within the transistor from collector to base.

The emitter of the transistor 34 is connected through a resistor 48 to the bias voltage line 44. The transistor is connected in the common emitter mode, and resistor 48 provides emitter degeneration to achieve temperature stability and transistor interchangeability. Capacitor 49 is a bypass capacitor connecting the emitter to ground. The direct current collector-emitter path for transistor bias is via inductors 52, 58, 62 to ground.

The collector of the transistor 34 is connected to a quadrupole tuned circuit 50 made up of two interrelated double-tuned networks. One of these double-tuned networks is a mutual-inductance coupled equivalent T-section that includes the input inductor 52 tuned with the series output capacitance of the transistor 34 to a high band frequency and an output inductor 54 and series capacitor 56 which are similarly tuned. The T-section is completed by an intermediate shunt inductor 58 that is connected between the junction of inductors 52 and 54 and a capacitor 60 at the input of the second double-tuned network. The latter is in the form of a mutual-inductance coupled equivalent pi-section and includes the parallel combination of capacitor 60 and an inductor 62 connected between the shunt inductor 58 and ground. This input combination 60, 62 is tuned to a frequency of the low band and is connected via series inductor 64 to an output combination of inductor 66 and capacitor 68 also tuned to the same frequency as the input combination 60 and 62. The inductor 66 is connected in shunt to ground, and the capacitor 68 is connected to the output terminal 70 of the quadrupole network 50, as is the capacitor 56.

The reactance of inductor 58 of the T-section is greater than that of capacitor 60 of the pi-section in the high band frequencies so that the combination is effectively inductive. Inductor 58 and capacitor 60 are tuned to a frequency well below the high band but above the low band. The pi-section is a high impedance in the high band frequencies and can be neglected. The input and output inductance-capacitance branches of the T-section are tuned to a frequency near 216 mc. which determines the high peak of the characteristic. The shunt inductor 58 is common to and directly couples the input and output branches and determines the separation of the two peaks, and thereby, the relative frequency of the low peak of the double-tuned T-section.

In the pi-section the L-C branches 60, 62 and 66, 68 are tuned to a frequency near 54 mc. which determines the low peak of the characteristic in the low pass band. The series inductor 64 is common to and directly couples the input and output branches and determines the separation of the two peaks of this double-tuned section, and thereby, the frequency of the high peak near 88 mc. Actually, the input network of the pi-section includes the output capacitance of the transistor 34, the inductors 52 and 58 in series, and the L-C combination 60, 62. The effective driving point for the input of the low band network is at the bottom of the shunt inductor 58 of the high band circuit. The output capacitors 56 and 68 of the two bands are effectively connected in parallel paths.

In the low band frequencies, inductor 54 and capacitor 56 are a high impedance arm and can be neglected. Also, inductors 52 and 58 in series with the transistor output capacitance resonate in the high band and do not interfere appreciably with low band tuning. The quadrupole output circuit is relatively easy to align in the factory since the individual inductance parameters of the T- and pi-sections do not include the magnetic coupling of transformers and can be readily adjusted.

In addition to the tuning function, the network 50 transforms the low impedance of the primary of an output transformer 72 up closer to the transistor output impedance. Transformer 72 is used for impedance transformation from the unbalanced 75 ohm impedance at which the circuit operates to the 300 ohm balanced impedance of the transmission line 74 to the television input or of that input itself. This transformation is performed by transformer 72 (connected between terminal 70 and output terminal 82 and with an intermediate tap at ground) together with inductor 76 and capacitor 78, the latter elements being connected between the terminal 70 in series to the other output terminal 80. The output terminals 80 and 82 provide connections to the twin-lead transmission line 74.

The power supplied for the transistor is provided by a 60 cycle A.C. signal carried by the transmission line and supplied to the transmission line by a transformer (not shown). A filter for separating the RF television signal from the 60 cycle A.C. is provided by capacitor 78 and an inductor 84 functioning as a choke; the choke 84 being connected from the terminal 80 to the anode of a rectifier diode 86, the cathode of which is connected to the D.C. voltage line 44. A capacitor 90 is connected across the rectifier 86 and functions as a bypass to prevent modulation by the varying impedance of the rectifier of any radio frequency signal that might be passed by the choke 84 or otherwise picked up. The capacitor 92 connected between the line 44 and ground functions as a filter for the D.C. power supply to minimize ripple and afford some surge protection from the output transmission line 74. The power for the transistor bias may be carried by separate wires from the RF transmission line, if more convenient, so that the RF section is more completely separated from the power supply.

The circuit parameters illustrated in FIG. 1 of the drawing set forth the design of a circuit for amplification of the television channel bands of 54 to 88 mc. and 174 to 216 mc. The inductor coils used for this particular circuit are simple spring-wound air coils which were readily adjusted for alignment to the required tuning characteristics by the simple expedient of changing the spacing of turns of the coils.

The T- and pi-sections of the quadrupole output circuit 50 are effective to present a high uniform output impedance to the transistor 34 at their respective frequencies for high voltage gain; thereby, better use of gain-bandwidth is attained in the operation of the circuit. The circuit 50 is also effective for impedance transformation from the high impedance at the transistor to the lower impedance at transformer 72 and for selectivity of the desired pass bands. Thus, the circuit of FIG. 1 is effective as a television preamplifier which can be mounted directly on the boom of a television antenna for preamplification of the antenna signal. The circuit is a compact one and trouble-free; the transistor insures long life, and the power supply makes the use of batteries unnecessary. The connection of the 60 cycle A.C. to the transmission line at the television receiver may be performed in any suitable known manner. The transistor 34 may also be connected in the common-base mode, and it may be replaced by a tube if desired with appropriate adjustment of circuit parameters.

A modification of the input circuit of the preamplifier is shown in FIG. 2. Parts corresponding to those previously described are referenced by the same numerals, and their operation is generally the same. In addition, a quadrupole input circuit 50' is provided which is similar to the output circuit 50 of FIG. 1; and parts corresponding to those of the quadrupole circuit 50 are referenced by the same numerals with the addition of a prime (').

The input circuit and impedance transformation circuit of FIG. 1 is omitted from FIG. 2, but the same circuit may be provided connecting the antenna transmission line to terminal 24 and ground. The quadrupole circuit 50', as indicated, is generally the same as the circuit 50 of FIG. 1 except that, used as an input circuit 50', it is connected in reverse fashion from the output circuit 50. Since the quadrupole circuit is a passive one, it has the same general characteristics when operated in either direction. The base input characteristic of the transistor 34 is essentially a resistive one; therefore, a capacitor 96 is used to connect the inductor 52' to the transistor base. The combination of inductor 52' and capacitor 96 is tuned to the same frequency as that of the inductor 52 and the output capacitance of the transistor 34 in FIG. 1. In other respects the amplifier of FIG. 2 is the same as FIG. 1, and the output circuit 50 is connected to the transistor 34 in the same manner as that shown in FIG. 1. Thus, the output circuit 50 provides a connection from the reactive transistor output to the resistive input of the impedance transformation network, while the input network 50' provides a connection from a resistive input to a resistive output.

The use of the quadrupole circuit 50' in the input circuit of the preamplifier is of value in providing impedance transformation to get voltage gain, or for impedance matching. It is also of value for selectivity or filtering, for example, to reject local frequency-modulation broadcast signals which have carrier frequencies between the separated pass band frequencies of the television broadcast channels. Thereby, the quadrupole circuit 50' tends to eliminate the frequency-modulation band and to prevent overloading of the single stage amplifier that is provided.

The quadrupole network 50 or 50' may also be used as an interstage coupling circuit, for example, to drive a transistor amplifier having a resistive input. As an interstage coupling, this network would function in a similar manner to that of the output circuit 50 or the input circuit 50'.

In comparing the networks 50 and 50', it may be noted that the signal source for the quadrupole network 50 is connected across the series combination of inductors 52, 58 and the input L–C combination 60, 62 of the pi-section, and the output capacitors 56 and 68 are in parallel paths connected to the output terminal 70. As an input network 50', the capacitors 56' and 68' are connected in parallel paths from the input terminal 24, and the input impedance of the transistor 34 functioning as the load is connected across the series combination of capacitor 96, inductors 52' and 58', and the combination of capacitor 60' and inductor 62'.

Broadly, the prime embodiment of this invention comprises a single stage broadband RF amplifier. A double-tuned input network before the amplifier stage is selective over a range including the high frequency and low frequency television bands. An output network behind the amplifier stage is a quadrupole-tuned network of "piggy back" configuration having the top part a double-tuned T-network for the high band and the bottom part a double-tuned pi-network for the low band. The outputs of the two networks are connected in parallel.

The input signal from a television line is received on a balanced transmission line of standard impedance. An impedance transformation network 20, 22, 26, 28, changes the balanced line so as to provide an unbalanced input impedance to a broadband double-tuned network ahead of the amplifying device. This broadband double-tuned circuit 30, 32, 38, 34, is selective over a frequency band wide enough to include both the low and high television bands. The purpose of having a double-tuned network here is to provide a selective frequency range wide enough to pass both television bands. A single-tuned network would peak too sharply to provide the most desirable character. This network permits the amplifying device to work at higher gain than would be possible otherwise.

The preferred amplifying device is a transistor provided with a positive direct biasing voltage. This power is obtained from transformed 60-cycle A.C. carried by the output transmission line. The 60-cycle A.C. is separated by a filter from the RF signal (78, 84), the 60-cycle A.C. is rectified (86) and means are provided as described elsewhere in more detail to prevent modulation of any RF signal present behind the filter, to minimize ripple in the D.C. behind the diode and to provide some surge protection from the output transmission line. A voltage divider 40, 42, provides the proper base bias potential.

A neutralizing transformer is provided to cancel the collector to base feed back in the transistor. The amplified RF signal from the transistor then passes to a quadrupole-tuned amplifier comprising a double-tuned mutual inductance coupled equivalent T-section (52, 54, 56, 58, 60, and the capacitance of 34). This provides an overlapping double-peaked pass characteristic selected for the high television frequency band. Selection of the low frequency television band is provided by a pi section 60, 62, 66, 68, which uses certain elements in common with the T-section. The pi section is also double-tuned to provide overlapping peaks so as to completely include the low frequency band. The outputs of the two sections are effectively parallel. The signal at output point 70 has been amplified and is selective with broad peaks covering, respectively, the high band and low band television frequencies, with rejection between the bands and on either side of the bands. An output transformer 72 transforms from an unbalanced impedance to the standard output transmission line balanced impedance for purposes of satisfactory input to a television receiver, for example. The quadrupole-tuned network also serves the function of coupling the high transistor output impedance to the low output transformer impedance. The coupling effects of the networks serves to improve the gain of the amplifying device.

This invention in its preferred form is for the purpose of providing a preamplifier for a television antenna signal, as noted above. However, it is not limited to that application and may be used for other purposes. Moreover, the specific set of parameters set forth in FIG. 1 are for the purpose of illustrating a preferred form of the invention and are not intended to be restrictive on the scope of the invention. Various modifications of the selective network and amplifier of this invention are contemplated within its scope.

What is claimed is:

1. A single-stage preamplifier for signals in separated frequency bands from a television antenna comprising an unbalanced double-tuned input circuit for passing the separated frequency bands, a circuit for transforming a 300 ohm balanced transmission line impedance to a lower impedance of said unbalanced input circuit, a transistor connected in the common-emitter mode having its base connected to receive the signals passed by said double-tuned circuit, an output circuit connected across the collector-emitter path of said transistor and including two double-tuned networks having input branches connected in series across said collector-emitter path and output branches connected in parallel paths to a common output terminal in an unbalanced line configuration, a circuit for transforming the impedance of a 300 ohm balanced output transmission line to the lower unbalanced impedance of said output circuit at said output terminals, and a rectifier and filter connected to said output impedance transforming circuit for providing a direct voltage for said transistor from an externally supplied alternating signal on the output transmission line.

2. A single-stage preamplifier for signals in separated frequency bands from a television antenna comprising an unbalanced double-tuned input circuit for passing the separated frequency bands, a circuit for transforming a 300 ohm balanced transmission line impedance to a lower impedance of said unbalanced input circuit, a transistor having its base electrode connected to the output of said double-tuned input circuit, an output circuit connected across the path of the collector and emitter of said transistor and including two double-tuned networks having series and shunt reactance elements, a first one of said networks having input and output inductance-capacitance branches tuned to a frequency near one end of one of said frequency bands, and an intermediate shunt inductance capacitance branch tuned to set the other end of said one frequency band and which branch is connected to the junction of the input and output branches, the second one of said networks having input and output inductance-capacitance branches tuned to a frequency near one end of the other of said frequency bands, and an intermediate series inductance capacitance branch connected in series with said input and output branches tuned to set the other end of said other frequency band, one of said input and output branches for said one band and said intermediate inductance branch being connected in series with one of said input and output branches for said other band and across said collector-emitter path, and the other of said input and output branches for each of said bands being connected in effective parallel paths to a common output terminal in an unbalanced line configuration, a circuit for transforming the impedance of a 300 ohm balanced output transmission line to the lower impedance of said output circuit at said output terminals, and a rectifier and filter connected to said output impedance transforming circuit for providing a direct voltage to said base of said transistor from an externally supplied alternating signal on the output transmission line.

3. A quadrupole circuit for passing signals in separated high and low frequency signal bands comprising an amplifier stage, two double-tuned networks having series and shunt reactance elements; a first one of said networks having input and output inductance-capacitance branches tuned to a frequency near one end of one of said frequency bands, and an intermediate shunt inductance branch tuned to set the other end of said one frequency band, said first network connected to the input circuit of said amplifier stage, the second one of said networks having input and output inductance-capacitance branches tuned to a frequency near one end of the other of said frequency bands, and an intermediate series inductance branch tuned to set the other end of said other frequency band said second network connected to the output circuit of said amplifier stage; only one of said input and output branches for said one band and said intermediate inductance branch being connected in series with one of said input and output branches for said other band, and the other of said input and output branches for each of said bands being connected in parallel paths.

4. A quadrupole circuit as recited in claim 3 wherein said one and other frequency bands are respectively high and low frequency bands.

References Cited by the Examiner

UNITED STATES PATENTS

| | | | |
|---|---|---|---|
| 2,422,087 | 6/1947 | Everett. | |
| 2,710,315 | 6/1955 | Tongue ---------- | 330—154 X |
| 2,790,035 | 4/1957 | Hylas et al. -------- | 330—154 X |

ROY LAKE, *Primary Examiner.*

N. KAUFMAN, *Assistant Examiner.*